United States Patent [19]

Umetani

[11] Patent Number: 4,907,185

[45] Date of Patent: Mar. 6, 1990

[54] PROGRAM-CONTROLLED COMPUTER WITH AN INTERRUPT CAPABILITY FOR FLOATING-POINT OPERATION

[75] Inventor: Yukio Umetani, Hachioji, Japan

[73] Assignee: Hitachi, Ltd., Tokyo, Japan

[21] Appl. No.: 860,845

[22] Filed: May 8, 1986

[30] Foreign Application Priority Data

May 10, 1985 [JP] Japan .................................. 60-97769

[51] Int. Cl.⁴ .......................... G06F 7/00; G06F 15/00
[52] U.S. Cl. .................................. 364/748; 364/736.5
[58] Field of Search ......................................... 364/748

[56] References Cited

U.S. PATENT DOCUMENTS

| | | | |
|---|---|---|---|
| 4,229,801 | 10/1980 | Whipple .............................. | 364/748 |
| 4,366,548 | 12/1982 | Kregness et al. .................... | 364/748 |
| 4,386,413 | 5/1983 | Vignes et al. ........................ | 364/748 |
| 4,511,990 | 4/1985 | Hagiwara et al. ................... | 364/748 |
| 4,644,490 | 2/1987 | Kobayashi et al. .................. | 364/748 |

OTHER PUBLICATIONS

Freiman et al., "Normalized Integer Operations for a Floating Point Arithmetic Unit," *IBM Technical Disclosure Bulletin*, vol. 9 #7, pp. 850–851, Dec. 1966.

*Primary Examiner*—Gary V. Harkcom
*Assistant Examiner*—Dale M. Shaw
*Attorney, Agent, or Firm*—Antonelli, Terry & Wands

[57] ABSTRACT

A program-controlled computer includes a first unit for executing an addition or a substraction on a first floating-point data and a second floating-point data inputted thereto, a second unit for receiving the exponents of the first and second floating-point data, for determining whether or not an absolute value of a difference between the exponents exceeds a predetermined value defined as a number of digits of a mantissa of the first or second floating-point data, and for generating an interrupt signal when the absolute value exceeds the number of digits, and third unit connected to the second unit for interrupting a program being executed in response to the interrupt signal so as to execute an interrupt processing program associated with the interrupt signal.

2 Claims, 2 Drawing Sheets

PROGRAM-CONTROLLED COMPUTER WITH AN INTERRUPT CAPABILITY FOR FLOATING-POINT OPERATION

BACKGROUND OF THE INVENTION

The present invention relates to a program-controlled computer comprising an arithmetic unit for processing floating-point data.

Arithmetic operations between floating-point data items in a computer are inevitably accompanied by occurrences of errors because the length of data representation is limited to a finite value. Specifically, there have been commonly known two causes of such errors, namely, "loss of significant digits" and "left-off" in the addition and subtraction. The loss of significant digits represents, in a subtraction effected upon two data items each having a similar value, that the number of significant digits of the mantissa is reduced. In an extreme case, the mantissa contains zero as a result of an arithmetic operation, namely, the significant digits are lost, and hence, this is called "loss of significance". On the other hand, left-off represents that, in an operation effected on two data items the magnitudes of which are greatly different from each other, that the mantissa of the data item having a smaller absolute value, as a result of adjustment of the digit positions, underflows from the lower-most significant digit and becomes zero, which cannot be reflected on the operation result. Consequently, in arithmetic operations on such data items, a considerable error may result if the sequence of the arithmetic operations is not carefully determined because the phenomena associated with small data items may contribute to the operation result.

Although the frequency of error occurrences can be generally minimized by the use of data with a long precision, this causes the necessary storage capacity and the processing time to be increased, and therefore the number of data items to which the long precision is assigned must be reduced to the optimal value. However, since the occurrences of errors depend on the data to be subjected to arithmetic operations, the frequency of error occurrences cannot be easily estimated when a program is prepared.

In the past, consequently, the long precision was assigned to all data items for which the "left-off" may possibly take place or a particular countermeasure was provided for each location for which such an error is likely to occur based on the final result of the operation, which leads to problems that the storage area and the amount of processing are increased and that the precision cannot be easily controlled. For the "loss of significant digits" of those two error causes described above, and particularly for "loss of significance", there has been well known a system for monitoring the error. (For example, refer to Section 6 of the "IBM 370 Principles of Operation" published by International Business Machines Corp.)

SUMMARY OF THE INVENTION

It is therefore an object of the present invention to provide a computer which is capable of detecting the "left-off state" occurring in an arithmetic operation, thereby overcoming the drawbacks of the prior art technique.

According to the present invention, there is provided a computer including first means for effecting an addition or a subtraction on first floating-point data and second floating-point data each inputted thereto, second means for receiving an exponent of the first floating-point data and an exponent of the second floating-point data, for determining whether or not an absolute value of a difference between the exponents exceeds a value defined as a number of digits of a mantissa of the first or second floating-point data, and for generating an interrupt signal when the absolute value exceeds the number of digits, and third means connected to the second means for interrupting a program being executed in response to the interrupt signal so as to effect an interrupt processing program associated with the interrupt signal

BRIEF DESCRIPTION OF THE DRAWINGS

The present invention will be apparent from the following detailed description taken in conjunction with the accompanying drawings in which.

DESCRIPTION OF THE PREFERRED EMBODIMENTS

Figure 1:
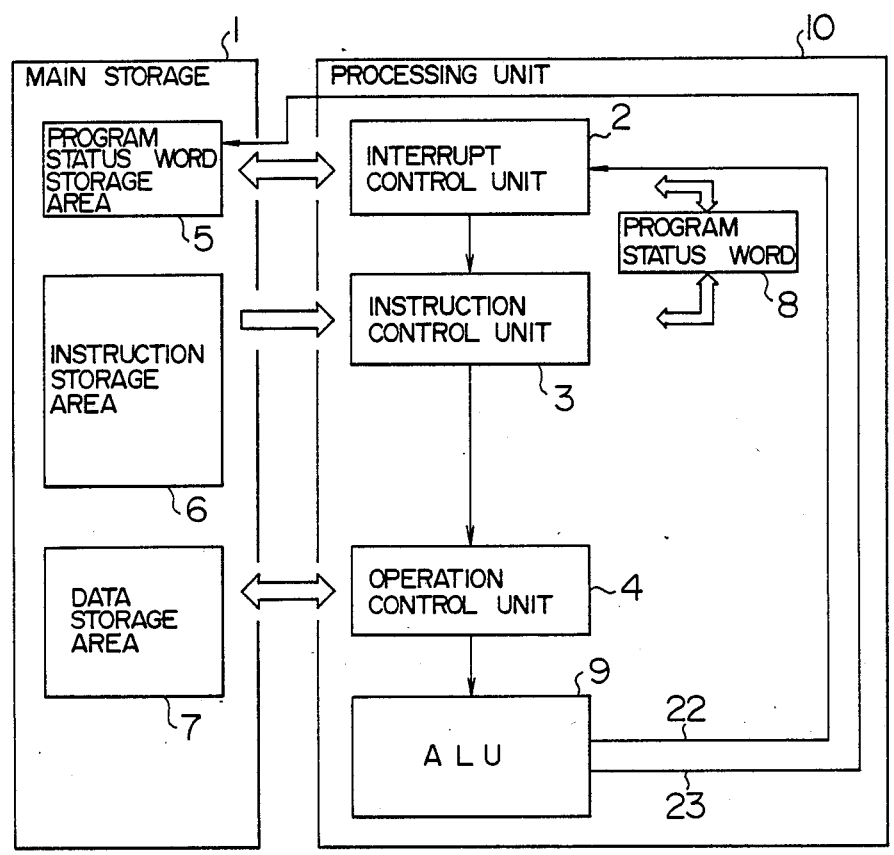
FIG. 1 is a schematic block diagram showing a configuration of a computer according to the present invention.

FIG. 1 is a schematic block diagram depicting an embodiment according to the present invention in which a double line and a single line indicate a data flow and a control information flow, respectively.

A string of instructions is stored in an instruction storage area 6 of a main storage 1, and an instruction control unit 3 of a processing unit 10 sequentially fetches each instruction from the main storage 1 and executes the instruction. An address of an instruction being processed is reflected on a program status word in a register 8 in any cases. The content of the program status word is updated as the program is executed. An instruction fetched by the instruction control unit 3 is passed to an operation control unit 4, which in turn calculates a main storage address for the data and reads data from a data storage area 7, and then a desired operation and a state detection are achieved in an arithmetic logic unit (ALU) 9 having a left-off detect circuit. The configuration and operations of the ALU 9 will be described later. When the operation instruction is an addition or a subtraction, if a left-off state is detected in the ALU 9, the ALU 9 outputs an interrupt signal 22 to an interrupt control unit 2, which in turn starts an interrupt operation. That is, a program being executed is interrupted, the contents of the program status word register 8 are stored in a program status word storage area 5 of the main storage 1, and the difference between the exponent values sent from the ALU 9 is also written in the program status word storage area 5. On the other hand, the contents of the program status word prepared for a left-off state interrupt is transferred from the status storage area 5 to the program status word register 8. Furthermore, the instruction control unit 3 fetches a string of instructions from the instruction storage area 6 according to information including an instruction address stored in the status register 8 so that an interrupt processing program is executed for operations such as an output of the difference between the exponent values and the address of the instruction that has caused the left-off state. The information outputted from the interrupt processing program such as the instruction address and the difference between the exponent values enables the programmer to assign the long precision to the pertinent data items, thereby eliminating the left-off state and improving the precision of the arithmetic operation.

Figure 2:
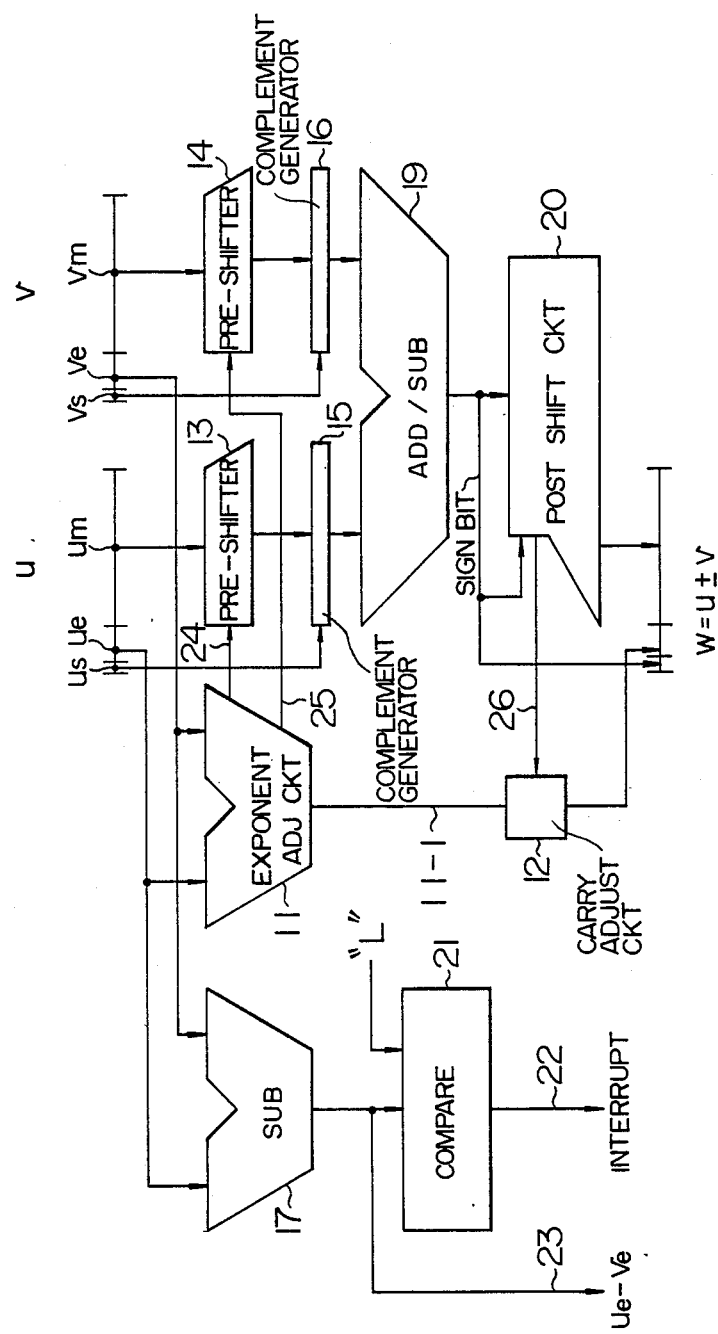
FIG. 2 is a block diagram illustrating an adder/subtractor circuit having a left-off state detect circuit.

Referring now to FIG. 2, the configuration and operations of sections related to the addition or subtraction in the ALU 9 will be described.

Floating point data items u and v read from the main storage 1 for an add/subtract operation are processed for a sign field, an exponent field, and a mantissa thereof. Exponent data items $U_e$ and $V_e$ are inputted to an exponent adjust circuit 11 for adjusting the number of digits, and one of these data items having a larger value is transmitted to a line 11-1. At the same time, the number of shift digits of the mantissa is obtained as a difference between the exponent value after the adjustment and $U_e$ via a line 24, whereas the number of shift digits of the mantissa representing a difference between the adjusted exponent value and $V_e$ is obtained via a line 25. For the data on the line 11-1, the number of left-shift digits of the mantissa for the normalization is obtained by counting the successive 0's (when the sign value is 0) or the successive 1's (when the sign value is 1) beginning from the top of the field based on the result from the addition or subtraction effected on the mantissa fields and the sign value. The obtained value is transmitted via a line 26 and is received by a carry adjust circuit 12 so as to effect an operation on the data from the line 11-1 and the value from the line 26, thereby transmitting an output to an exponent field of the result w. On the other hand, the mantissa data items $u_m$ and $v_m$ are subjected to right-shift operations requested by preshifter circuits 13, 14, respectively which are controlled by the numbers of shift digits delivered through the lines 24, 25, respectively. If the sign codes $u_s$ and $v_s$ each containing 1 (negative), these values are converted into complements by complement generators 15, 16, respectively, and are inputted to an adder/subtractor circuit 19. The result of the addition or subtraction obtained from the adder/subtractor 19 is supplied to a post-shift circuit 20 and is subjected to a normalization therein, and the data is shifted left until the higher-most digit becomes other than zero (when the sign of the result indicates a positive value (0)) or zero (when the sign indicates a negative value (1)), and then the resultant data is transferred to the mantissa field of the result w. At the same time, the number of post-shift digits is loaded on a line 26.

The sign of the result is sent to the sign field of the u+v and is simultaneously transmitted to the post-shift circuit 20 to control the shift operation. In the post-shift circuit 20, an operation to obtain a complement of the resultant data is also achieved if the sign of the result is 1 (negative). In concurrence with this operation, the exponent difference calculate circuit 17 calculates a difference 23 between the exponent $v_e$ and $u_e$ of the input data, and the compare circuit 21 compares the absolute value of the difference 23 with the number of digits of the mantissa "L". If the former is greater than the latter, the left-off state is detected and a signal 22 indicating this state is transferred to the interrupt control unit 2 (FIG. 1). Moreover, the exponent difference 23 is also transmitted thereto a the same time. The circuits 17 and 21 are novel features according to the present invention.

According to the present invention, the left-off state can be dynamically monitored, which enables the instruction address where the left-off state has occurred and the exponent difference to be collected by use of an appropriate software processing at an occurrence of a left-off state. Consequently, based on these information items after the arithmetic operation is finished, the long precision can be efficiently assigned to the appropriate data and operations to improve the precision of the arithmetic operation.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

I claim:

1. A program-controlled computer comprising:
   first means for effecting a floating-point addition operation or a floating-point subtraction operation on first floating-point data and second floating-point data each inputted thereto;
   second means for receiving an exponent of the first floating-point data and an exponent of the second floating-point data, for determining whether or not an absolute value of a difference between said exponents exceeds a predetermined value defined as a number of digits of a mantissa of the first or second floating-point data, and for generating an interrupt signal to indicate detection of a left-off state when the absolute value exceeds the number of digits; and
   third means connected to said second means for interrupting a program being executed in response to said interrupt signal so as to execute an interrupt processing program associated with said interrupt signal.

2. A program-controlled computer according to claim 1, wherein said second means includes
   means for detecting a difference between an exponent of the first floating-point data and an exponent of the second floating-point data, and
   compare means connected to said difference detect means for comparing an absolute value of the detected difference with the predetermined value and for generating the interrupt signal when the absolute value exceeds the predetermined value; and
   said third means outputs the detected exponent difference through the execution of the interrupt processing program.

* * * * *